May 1, 1956 C. D. FOSS 2,743,947
JOURNAL BOX SEAL WITH FLOATING SLEEVE
Filed Jan. 7, 1952 2 Sheets-Sheet 1
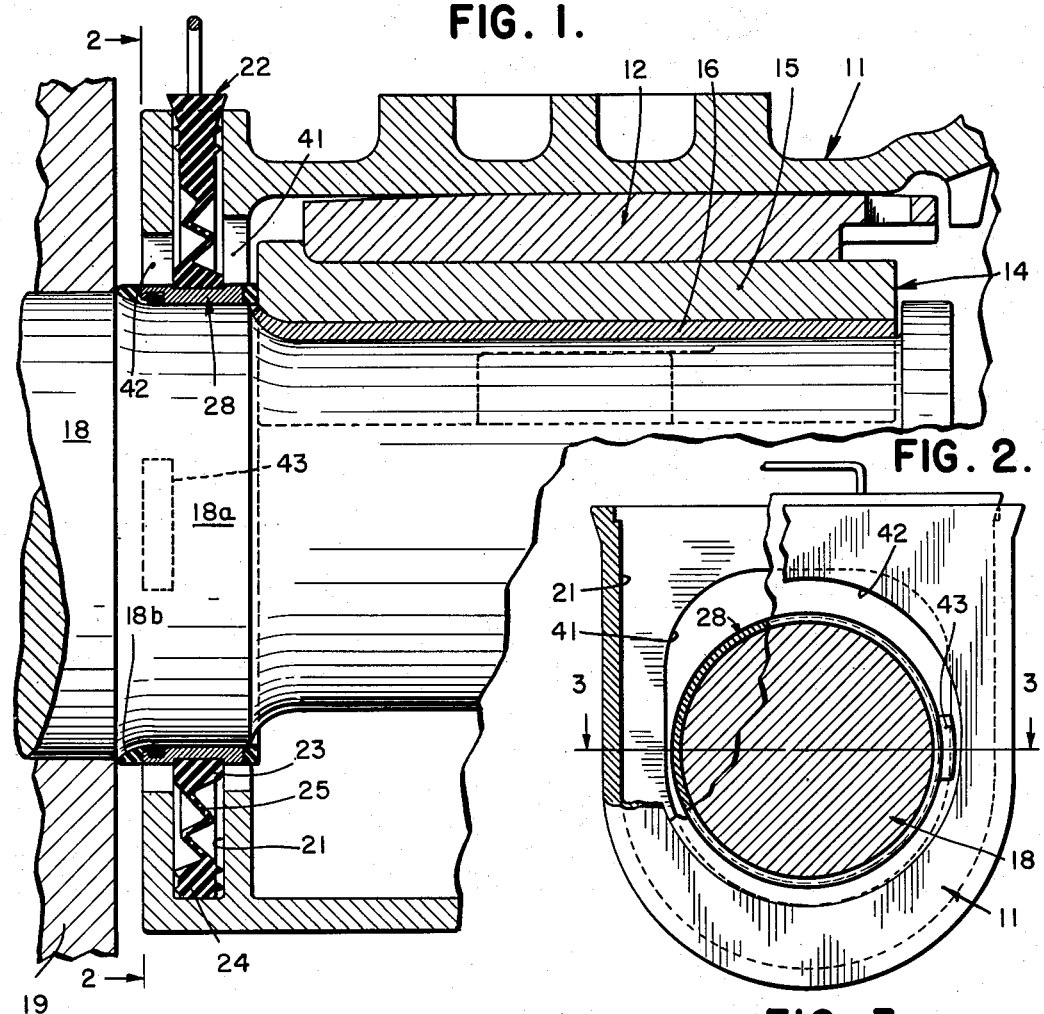
INVENTOR
CURTIS D. FOSS
BY
Mason & Graham
ATTORNEYS May 1, 1956   C. D. FOSS   2,743,947
JOURNAL BOX SEAL WITH FLOATING SLEEVE
Filed Jan. 7, 1952   2 Sheets-Sheet 2

INVENTOR
CURTIS D. FOSS
BY
Mason & Graham
ATTORNEYS 2,743,947

JOURNAL BOX SEAL WITH FLOATING SLEEVE

Curtis D. Foss, Los Angeles, Calif.

Application January 7, 1952, Serial No. 265,333

9 Claims. (Cl. 286—6)

This invention has to do generally with means for maintaining a fluid-tight seal between a moving element and a stationary member such as between a rotating shaft and a stationary housing and has to do particularly with seals used at the inner ends of railway car journal boxes.

Great difficulty has been experienced in attempting to provide a successful seal between the axle and journal boxes of railway cars due to the fact that there is considerable axial and radial movement of the axle in addition to the normal rotative movement. The seal to be effective must therefore be highly flexible to allow for these radial and axial movements. One of the major difficulties has been that where excessive axial movement of the axle is encountered, as often occurs in the case of freight cars, the portion of the seal engaging the axle may run off the cylindrical plateau part of the axle just inwardly of the journal or bearing portion with the result that the seal may become pinched or otherwise damaged and subsequently fails to perform its intended purpose.

It is an object of this invention to provide novel means especially adapted for use in railway car journal boxes which provides an effective seal between the axle and the journal box and which overcomes the difficulty pointed out above.

Another object of the invention is to provide sealing means which tends to limit horizontal radial movement of the axle.

A further object is to provide a seal means embodying a floating sleeve about the axle.

Another object is to provide a sealing construction which is simple, rugged, and easy to install.

These and other objects will be apparent from the drawings and the following description thereof.

Referring to the drawings,

Fig. 1 is a partial sectional view of a railway car journal box and axle and sealing means therefor embodying the invention;

Fig. 2 is a sectional view on line 2—2 of Fig. 1 on a reduced scale and partly broken away;

Fig. 3 is a fragmentary sectional view on line 3—3 of Fig. 2;

Fig. 4 is an enlarged fragmentary sectional view of a portion of the sleeve of the sealing means;

Figure 5:
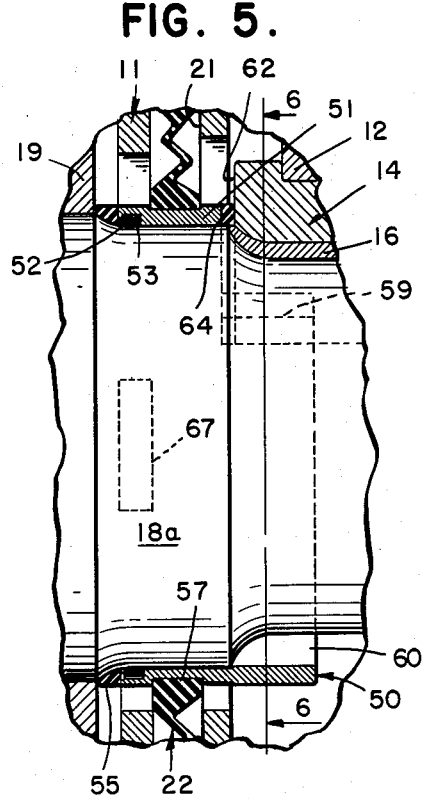
Fig. 5 is a fragmentary view similar to Fig. 1 showing another form of sleeve member.

More particularly describing the invention, 11 generally indicates the journal box of a railway car. Within the box is the conventional wedge 12 and bearing 14, the latter comprising a body 15 with a bearing-metal liner 16. Numeral 18 indicates the car axle and 19 the hub of the wheel thereon.

The journal box is provided with the conventional dust guard slot 21 which customarily receives a dust guard or seal. I mount a seal member 22 in this slot. The seal member comprises an inner sealing ring portion 23, an outer relatively stiff body 24 and an intermediate, thin, corrugated, flexible section 25. This seal member is the same as that disclosed in my copending application for patent Serial No. 742,423, filed April 18, 1947, for Dust Guard and Seal for Inner End of Journal Box, now U. S. Patent 2,692,783, issued October 26, 1954.

It is a particular feature of my sealing means that I provide a floating, self-aligning sleeve between the seal 22 and the car axle, the sleeve being generally indicated by numeral 28. The sleeve, in the form shown in Figs. 1–4, comprises a cylindrical body member 29, preferably of metal such as steel, provided with an internal seal ring 30 mounted in a groove 31. The particular seal ring shown has an internal coil spring 32 which resiliently reinforces and tends to maintain the seal ring in engagement with the surface 18a of the car axle. Also, the seal ring 30 is shown as provided with an axially projecting flared portion 34 which acts as a nosing for the body 29. The portion 34 is preferably bonded to the member 29. The seal ring 30 is adapted to ride on and make sealing engagement with the axle.

The metal sleeve 29 is provided with cushion 37 of resilient material at the end opposite that having the nosing 34. Also, the sleeve may be covered with the same material at 38 and 39 and these portions and cushion 37 bonded to the metal by a conventional process.

A peripheral groove 40 is provided in the metal sleeve body 29 to receive the inner ring portion 23 of the seal member 22 which tightly engages the sleeve making a fluid-tight joint. Such axial movement of the axle as may take place is accommodated for by the sleeve which is made shorter than the surface 18a of the axle. In this connection it should be noted that in Fig. 1 the axle is shown as far to the right as it can be moved so that any travel of the particular axle shown would be to the left in the drawing.

Since the ribs 41 and 42, which define the slot 21 of the journal box, extend inwardly at the sides different distances, the rib 41 extending inwardly farther than rib 42, I provide lugs 43 on the seal member 28, one at each side thereof opposite the rib 42. These ribs are preferably of a thickness such that they make up for the difference in the space between the seal ring and the ribs so that there is the same amount of clearance between the lugs and rib 42 as there is between the outside of the sleeve 28 and the ribs 41. With this construction there is less possibility of any damage to the sleeve 28 through lateral radial movement of the axle, and such movement is limited by the sleeve.

With the construction defined, I provide a sleeve member 28 which is floatingly mounted on and makes sealing engagement with the car axle. The sleeve member is encompassed by my seal member 22, mounted in the conventional dust guard slot 21 of the journal box, which makes sealing engagement with the sleeve and accommodates for any later radial or axial movement thereof. The sleeve member is self-aligning on the axle. It also serves to limit undue horizontal radial movement of the axle. Under normal conditions the sleeve 28 does not rotate within the seal member 23.

Figure 6:
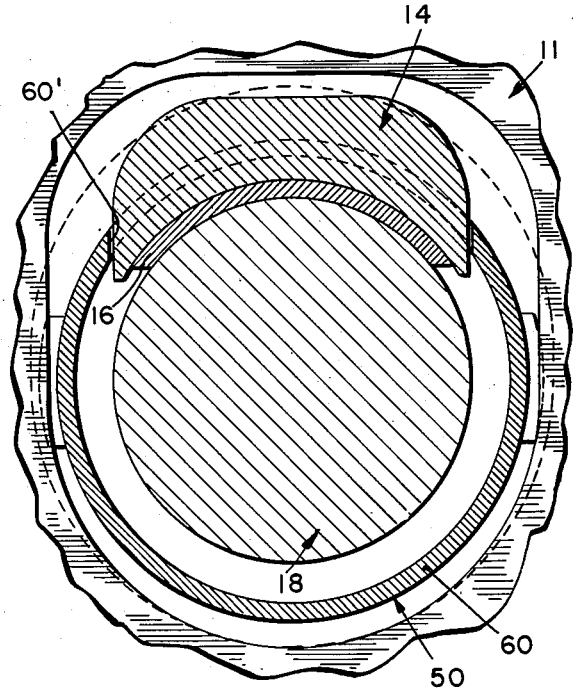
Fig. 6 is a section on line 6—6 of Fig. 5.
Figure 7:
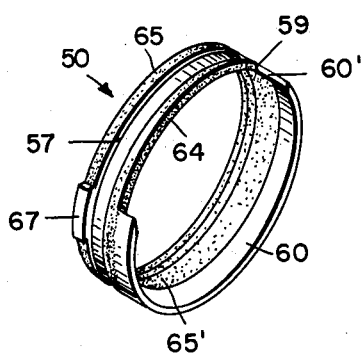
Fig. 7 is a perspective view of the sleeve of Fig. 5.

In Figs. 5–7 I show another form of the invention which differs from that previously described only in the use of a different type of sleeve. The axle, journal box, and other parts shown will be numbered correspondingly to that of the same parts previously shown and described. Referring to these figures, I provide a sleeve 50 having a metal body 51 and having an internal groove 52 to receive a seal ring 53. The seal ring may be of any conventional type. One end of the metal sleeve body 51 has a tapered nosing 55 of synthetic rubber or other suitable resilient material and this is bonded to the end of the metal body 51. The body 51 is also provided with a peripheral groove 57 to receive the member 22 previously described.

One end of the sleeve body 51 is formed with a recessed portion 59 of a size to accommodate the bearing 14. This construction provides a skirt portion 60 which extends beyond the face 62 of the bearing 14 as best shown in Fig. 5. The skirt portion 60 extends substantially more than 180° and substantially less than 360° circumferentially. The inner edge of the recessed portion is preferably provided with a resilient protecting bumper strip 64 for abutting engagement with the end surface 62 of the bearing 14. In this form of the invention the outer surfaces of the metal body 51 may be covered with synthetic rubber or the like 65 and also the interior thereof may also be similarly covered with a like material 65′. However, this is not essential.

The sleeve 50 is also provided with oppositely disposed lugs 67 which are for the same purpose as the lugs 43 on the sleeve previously described.

The sleeve 50 operates in the same manner as the sleeve previously described, the seal ring 53 therein making sealing engagement with the axle. The sleeve is floatingly mounted except that it is prevented from rotating by the skirt 60, the ends 60′ of which are disposed closely adjacent the sides of the bearing 14.

Figure 8:
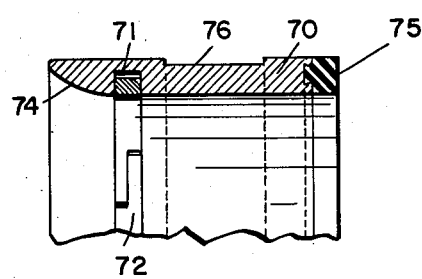
Fig. 8 is a fragmentary view similar to Fig. 4 showing a modified sleeve.

In Fig. 8 I show another form of sleeve member which comprises a cylindrical metal body 70 which may be formed of brass or other metal. This has an internal groove 71 which receives a split metal seal ring 72. One end of the sleeve 70 is tapered at 74 to accommodate the fillet portion of the axle. The opposite end of the sleeve is provided with a resilient bumper cushion member 75 of synthetic rubber or other suitable material. The sleeve is also provided with peripheral groove 76 to receive the seal member 22 previously described. The sleeve shown in Fig. 8 operates in the same manner as the sleeve 28 previously described.

Although I have illustrated and described a preferred form of my invention, I contemplate that various changes and modifications can be made without departing from the invention, the scope of which is indicated by the following claims.

I claim:

1. A sleeve construction for use as described comprising a cylindrical metal body having an internal groove adjacent one end, an outwardly flared inner wall beyond said groove at said one end, a resilient seal ring in said internal groove, and a resilient cushion secured to the other end of said body.

2. A sleeve construction as defined in claim 1 in which said body has a peripheral groove.

3. A sleeve construction for use as described comprising a cylindrical metal body having an internal groove adjacent one end, an outwardly flared inner wall beyond said groove at said one end, the other end of said sleeve having an axially extending recess of substantial width, a resilient seal ring in said internal groove, and a resilient end member secured to said body at the edge forming the inner limit of said recess.

4. Means for effecting a fluid-tight seal between a railway car journal box having a dust guard slot at one end and an axle projecting into said box, a metal sleeve in said box at the dust guard end thereof surrounding said axle, a seal ring mounted within said sleeve adjacent one end thereof for engaging said axle, and a flexible seal member surrounding said sleeve and mounted in said dust guard slot, said flexible seal member engaging the periphery of said sleeve in a region axially spaced from said seal ring.

5. Means for effecting a fluid-tight seal between a railway car journal box having a dust guard slot at one end and an axle projecting into said box, a metal sleeve in said box at the dust guard end thereof surrounding said axle, a seal ring mounted within said sleeve for engaging said axle, a resilient end member on said sleeve, and a flexible seal member surrounding and engaging said sleeve and mounted in said dust guard slot.

6. Means as set forth in claim 5 in which said sleeve has an outwardly flared inner wall at its end opposite said resilient end member.

7. Means as set forth in claim 5 in which said metal sleeve has a skirt extending axially beyond said resilient end member, in which said skirt extends substantially more than 180° and substantially less than 360° circumferentially and in which said resilient end member extends circumferentially between the edges of the skirt.

8. A sleeve construction for use as described comprising a cylindrical metal body having an internal groove adjacent one end, a seal ring in said groove, a resilient nosing secured to said metal body at the end adjacent said groove and having an outwardly tapered internal surface, and a resilient end member secured to said body at the other end thereof.

9. A sleeve construction as set forth in claim 8 in which said metal body has a peripheral groove and in which the entire surface of said body except the region of said first- and second-mentioned grooves is covered with a nonmetallic coating.

References Cited in the file of this patent

UNITED STATES PATENTS

| Number | Name | Date |
|---|---|---|
| 270,262 | Sweeney | Jan. 9, 1883 |
| 554,079 | McCord et al. | Feb. 4, 1896 |
| 1,672,345 | Schneider | June 5, 1928 |
| 2,176,294 | Cox | Oct. 17, 1939 |
| 2,210,543 | Cox | Aug. 6, 1940 |
| 2,277,196 | Arif | Mar. 24, 1942 |
| 2,377,387 | Stromeier | June 5, 1945 |
| 2,487,669 | Pattullo et al. | Nov. 8, 1949 |
| 2,560,557 | Curtis | June 17, 1951 |
| 2,692,783 | Foss | Oct. 26, 1954 |

FOREIGN PATENTS

| Number | Country | Date |
|---|---|---|
| 16,221 | Netherlands | May 16, 1927 |
| 562,456 | Great Britain | July 3, 1944 |
| 587,248 | Great Britain | Apr. 18, 1947 |
| 587,249 | Great Britain | Apr. 18, 1947 |
| 621,526 | Great Britain | Apr. 11, 1949 |